Patented May 23, 1950

2,508,418

UNITED STATES PATENT OFFICE 2,508,418

N-SUBSTITUTED POLY-IODO PHTHALIMIDES

William H. Strain, Rochester, N. Y., and Joseph Dec, Martinsville, N. J., assignors to Eli Lilly and Company, Indianapolis, Ind., a corporation of Indiana No Drawing. Application December 4, 1947, Serial No. 789,764

6 Claims. (Cl. 260—326)

Our invention relates to novel compositions of matter suitable for roentgenologic studies and more particularly to novel iodinated phthalimide derivatives.

Objects of our invention include the provision of radiopaque substances suitable for introduction in the gastrointestinal tract and which when so introduced will form an even coating on the interior of the tract but which will not be appreciably absorbed, nor cause any disturbance of the tract which would prevent an accurate roentgenologic portrayal thereof. Other objects include the provision of radiopaque substances which when suitably introduced in the gastrointestinal tract will delineate the walls of the tract so clearly that any lesions thereon will be observable. Other objects will become apparent as the following description proceeds.

In accordance with our invention we provide radiopaque substances comprising novel iodinated phthalimide derivatives which may be represented by the following formula

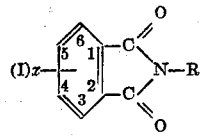

wherein $x$ is a whole integer from 2 to 4; and R is a member of the group consisting of aliphatic groups having from 1 to 5 carbon atoms and alkoxyaliphatic groups having from 2 to 5 carbon atoms.

Illustrative phthalimide derivatives within the scope of the above formula are 3,6-diiodophthalimidomethane, α - (3,4,6 - triiodophthalimido)-γ-methoxybutane, 3,4,5,6-tetraiodophthalimido-isopentane, 3,4,5,6 - tetraiodophthalimido-butene-2, and 3,4,6-triiodo-phthalimido-β-methoxypropane.

It will be noted that the above-represented novel compounds contain a relatively large proportion of iodine. The high iodine content is desirable since it is the iodine which confers an opacity to X-rays. Accordingly, our preferred phthalimide derivatives are those which are tetraiodinated, that is, those which contain four iodine atoms in the benzene ring of the phthalimide portion of the molecule. We have discovered that the high iodine content not only confers upon the phthalimide derivatives a high degree of opacity to X-rays, but also remarkably reduces their solubility thus preventing their absorption by the intestinal tract which would make them unsuitable for gastrointestinal roentgenologic purposes. We are aware that Allen and Nicholls in J. Am. Chem. Soc. 56, 1409 (1934) have described certain chlorinated phthalimide derivatives. However, these derivatives not only lack the necessary opacity to X-rays, but also fail to possess the low solubility required for satisfactory performance as gastrointestinal radiopaque substances. Moreover, the method described by Allen et al. is unsuitable for the preparation of our derivatives.

To prepare our novel phthalimide derivatives we react an iodinated phthalic anhydride with a formamide in which the amide nitrogen has as a substituent the appropriate aliphatic or alkoxyaliphatic group. During the reaction the oxygen atom in the phthalic anhydride molecule is replaced by the aliphatic amino or alkoxyaliphatic amino group of the substituted formamide, and the desired phthalimide derivative is produced.

Iodinated phthalic anhydrides which we may use as starting materials are known to the art and their method of preparation has been described by Pratt and Perkins [J. Am. Chem. Soc. 40, 198 (1918)] and by Pratt and Shupp [J. Am. Chem Soc. 40, 254 (1918)]. Some of the iodinated phthalic anhydrides are available commercially. The formamides used in preparing our compounds are readily available by methods of preparation known to the art, for example, the method of Linnemann [J. Chem. Soc. 1869, 601].

The process of preparing our novel phthalimide derivatives is set out in detail in the following specific examples.

Example 1

Preparation of 3,4,5,6-tetraiodophthalimidomethane.

326 parts of tetraiodophthalic anhydride (commercially obtainable technical grade) and 590 parts of N-methylformamide are mixed together and heated with stirring to 150–160° C. for about one hour. As the reaction proceeds, some of the 3,4,5,6-tetraiodophthalimidomethane separates as a solid. The reaction mixture is cooled to about room temperature and the 3,4,5,6-tetraiodophthalimidomethane which separates in excellent yield in the form of a yellow powder is filtered off. It is purified by suspending it in water, filtering the suspension and washing the solid 3,4,5,6-tetraiodophthalimidomethane which collects on the filter, with water and alcohol. The product so obtained melts at about 300° C.

The technical grade of tetraiodophthalic anhydride used in the above preparation contains small amounts of di- and triiodophthalic anhydride and consequently the 3,4,5,6-tetraiodophthalimidomethane is contaminated with some di- and tri-iodophthalimidomethane. If the pure tetraiodo compound is desired, pure tetraiodophthalic anhydride should be employed in the reaction since it is difficult to purify the tetraiodophthalimido compound by crystallization. For the purposes of this invention, however, a mixture prepared according to the above procedure is eminently satisfactory.

*Example 2*

3,6-diiodophthalimidomethane is prepared from 3,6-diiodophthalic anhydride and N-methylformamide by the procedure described in Example 1 for the preparation of the tetra-iodinated phthalimide derivative.

*Example 3*

Preparation of 3,4,5,6-tetraiodophthalimidomethane.

65 parts of tetraiodophthalic anhydride and 59 parts of N-methylformamide are dissolved in about 250 parts of nitrobenzene and the mixture is stirred and heated to 160–170° C. for about one and one half hours. During the heating, some of the 3,4,5,6-tetraiodophthalimidoethane separates as a solid. The reaction mixture is cooled and the 3,4,5,6-tetraiodophthalimidomethane which has precipitated as a yellow crystalline solid is filtered off. The precipitated solid is washed with about 50 volumes of hot methanol and the small amount of nitrobenzene entrained in the solid is removed by subjecting the solid to steam distillation for about one half hour. The residue of 3,4,5,6-tetraiodophthalimidomethane is separated from the water by filtration and dried. The product so obtained melts at about 313–318° C. Upon recrystallization from chlorobenzene the product is obtained in substantially pure form and melts at about 325–327° C.

In place of the nitrobenzene employed in the above example, other diluents or extending agents will be apparent to one skilled in the art. Suitable agents include cumene, isocumene, xylene, chlorobenzene and anisole. If desired, ethanol, butyl ether and the like may be used as diluents and the reaction carried out in a closed system to permit a sufficient degree of heat to be applied to the reaction.

When no diluent is employed, it is desirable to use an amount of the formamide sufficient to serve both as a reagent and a diluent. In either event, an excess of the formamide should be present in the reaction mixture to insure the complete reaction of the iodinated phthalic anhydride.

*Example 4*

Preparation of 3,4,5,6-tetraiodophthalimidoethane.

A mixture of 326 parts of 3,4,5,6-tetraiodophthalic anhydride and 730 parts of N-ethylformamide is heated with stirring at 150–160° C. for about one hour. The 3,4,5,6-tetraiodophthalimidoethane which is formed during the reaction is isolated and purified by the procedure described in Example 1. 3,4,5,6-tetraiodophthalimidoethane so obtained melts with decomposition at about 310° C.

*Example 5*

Preparation of 3,4,5,6-tetraiodophthalimidoisopropane.

A mixture of 326 parts of 3,4,5,6-tetraiodophthalic anhydride and 870 parts of N-isopropylformamide is heated with stirring at 150–160° C. for about one hour. The yellow precipitate of 3,4,5,6-tetraiodophthalimidoisopropane obtained in the reaction mixture is isolated and purified by the procedure described in Example 1. The 3,4,5,6-tetraiodophthalimidoisopropane so obtained melts with decomposition at about 305–310° C.

The N-isopropylformamide used in the reaction may be prepared by the method of Linnemann [J. Chem. Soc. 1869, 601]. The compound which boils at about 110° C. at 20 mm. pressure has been described by Gautier [Ann. 149, 158 (1869)].

*Example 6*

Preparation of 3,4,5,6-tetraiodophthalimidopropene-2.

A mixture of 400 parts of N-allylformamide which may be prepared by the method of Clayton [Ber. 28, 1666 (1895)], and 150 parts of 3,4,5,6-tetraiodophthalic anhydride, is reacted according to the procedure described in Example 1. The 3,4,5,6-tetraiodophthalimidopropene-2 so obtained melts with decomposition at about 300° C.

*Example 7*

Preparation of α-(3,4,5,6-tetraiodophthalimido)-β-methoxyethane.

N-β-methoxyethylformamide which boils at about 112° C. at 18 mm. pressure and which is prepared in the usual manner, is reacted with 3,4,5,6-tetraiodophthalic anhydride in the proportions of and according to the procedure described in Example 1. The α-(tetraiodophthalimido)-β-methoxyethane thus prepared melts with decomposition at about 305° C.

Our novel phthalimide derivatives are valuable contrast media for radiographic diagnosis. Preparations containing our poly-iodinated phthalimide derivatives are less gritty and more palatable than those containing barium sulfate, do not settle out so readily and give a more adherent coating on the bowel wall. Comparative studies of some of our phthalimide derivatives and barium sulfate have shown that our phthalimide derivatives give a more complete and accurate delineation of experimentally produced lesions. Moreover, double contrast enema studies show a more even coating of the intestinal wall than is generally obtainable with barium sulfate. Furthermore, unlike barium sulfate, our phthalide derivative produce no insipissation of the bowel wall which causes confusion in the interpretation of roentgenographs. Our phthalimide derivatives have a remarkably low toxicity when given orally. For example, oral administration of 3,4,5,6-tetraiodophthalimidomethane to fasting rats in amounts up to 15 g. per kilogram produced no toxic symptoms. Moreover, growth curves of rats whose diets contained about 4 percent of tetraiodophthalimidomethane were more nearly normal than those of rats whose diets contained 4 percent of barium sulfate. Furthermore, unlike iodinated phthalimides in which the hydrogen atom attached to the imide nitrogen has not been replaced, our novel phthalimide derivatives possess the surprising advantage of producing no increased peristalsis upon ingestion, a feature which is highly desirable since visualization of the existing or normative condition of the bowel is desired.

For radiopaque purposes, our phthalimide derivatives may be administered in the form of aqueous suspensions. For such administration the derivatives are reduced to a finely divided state, desirably to a particle size less than about 1 micron. This fine division may be obtained by methods known to the art, for example, by grinding, ball milling, or by passing an aqueous suspension of the compound through a suitable colloid mill. We have found that aqueous suspensions containing from 15 to 30 percent of our iodinated compounds form stable suspensions which in themselves are not unpleasant to take and which, if desired, may be made yet more palatable by the addition of small amounts of a flavoring agent.

We claim:

1. Iodinated phthalimide derivatives represented by the following formula

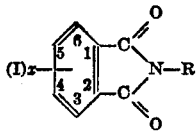

wherein $x$ is a whole integer from 2 to 4, and R is a member of the group consisting of aliphatic groups having from 1 to 5 carbon atoms and alkoxyaliphatic groups having from 2 to 5 carbon atoms.

2. 3,4,5,6-tetraiodophthalimidoalkanes wherein the alkane portion of the molecule has from 1 to 5 carbon atoms.
3. 3,4,5,6-tetraiodophthalimidomethane.
4. 3,4,5,6-tetraiodophthalimidoethane.
5. 3,4,5,6-tetraiodophthalimidoisopropane.
6. Radiopaque compositions comprising compounds according to claim 1 in finely divided state, suspended in aqueous media.

WILLIAM H. STRAIN.
JOSEPH DEC.

REFERENCES CITED

The following references are of record in the file of this patent:

UNITED STATES PATENTS

| Number | Name | Date |
|---|---|---|
| 2,451,637 | Strain et al. | Oct. 19, 1948 |

OTHER REFERENCES

Pratt et al., J. Amer. Chem. Soc., vol. 40 (1918), pp. 212, 225, 229, 231 and 233.

Allen et al., J. Amer. Chem. Soc., vol. 56 (1934), pp. 1409 and 1410.

Schulze, Manufacturing Chemist (Jan., 1935), pp. 5 to 7.

Hefke Jour. Am. Med. Assn. (June 10, 1941), vol. 125, p. 455.